(12) United States Patent
Chang et al.

(10) Patent No.: US 8,248,408 B2
(45) Date of Patent: Aug. 21, 2012

(54) METHOD FOR UNIFORMIZING SURFACE NORMALS OF A THREE-DIMENSIONAL MODEL

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 927 days.

(21) Appl. No.: 12/274,356

(22) Filed: Nov. 20, 2008

(65) Prior Publication Data
US 2009/0135181 A1    May 28, 2009

(30) Foreign Application Priority Data

Nov. 23, 2007 (CN) .......................... 2007 1 0202648

(51) Int. Cl.
| | |
|---|---|
| G06T 17/00 | (2006.01) |
| G06T 15/10 | (2011.01) |
| G06T 15/20 | (2011.01) |
| G09G 5/00 | (2006.01) |

(52) U.S. Cl. .......................... 345/420; 345/427; 345/619

(58) Field of Classification Search .................. 345/420, 345/427, 619
See application file for complete search history.

(56) References Cited

U.S. PATENT DOCUMENTS

| | | | | |
|---|---|---|---|---|
| 2001/0005204 A1* | 6/2001 | Matsumoto et al. | .......... | 345/418 |
| 2002/0120920 A1* | 8/2002 | Jayaram et al. | ............... | 717/137 |
| 2003/0179203 A1* | 9/2003 | Bruderlin et al. | ............. | 345/473 |
| 2005/0163357 A1* | 7/2005 | Makram-Ebeid et al. | ..... | 382/128 |
| 2007/0080967 A1* | 4/2007 | Miller | ........................... | 345/473 |
| 2008/0266293 A1* | 10/2008 | Cohen | ........................... | 345/424 |
| 2009/0033674 A1* | 2/2009 | Murrah et al. | ................ | 345/584 |

OTHER PUBLICATIONS

Hoffman et al.; Parts of Recognition; Dec. 1983; MIT Artificial Intelligence Laboratory; Memo No. 732.*
Benko et al.; Algorithms for Reverse Engineering Boundary Representation Models; Jan. 2001; Computer Aided Design, 33; pp. 839-851.*

* cited by examiner

*Primary Examiner* — David T Welch
(74) *Attorney, Agent, or Firm* — Altis Law Group, Inc.

(57) ABSTRACT

A method for uniformizing surface normals of a three-dimensional model is provided. The method uniformizes the surface normals to surfaces in the three-dimensional model by determining intersection surfaces of each of the surfaces, and determining surfaces whose surface normals are to be reversed according to the intersection surfaces of each of the surfaces. The method may make surface normals consistent.

14 Claims, 9 Drawing Sheets

METHOD FOR UNIFORMIZING SURFACE NORMALS OF A THREE-DIMENSIONAL MODEL

FIELD OF THE INVENTION

Embodiments of the present disclosure relate to three-dimensional (3D) computer graphics, and more particularly to a method for uniformizing surface normals of a 3D model.

DESCRIPTION OF RELATED ART

Figure 1:
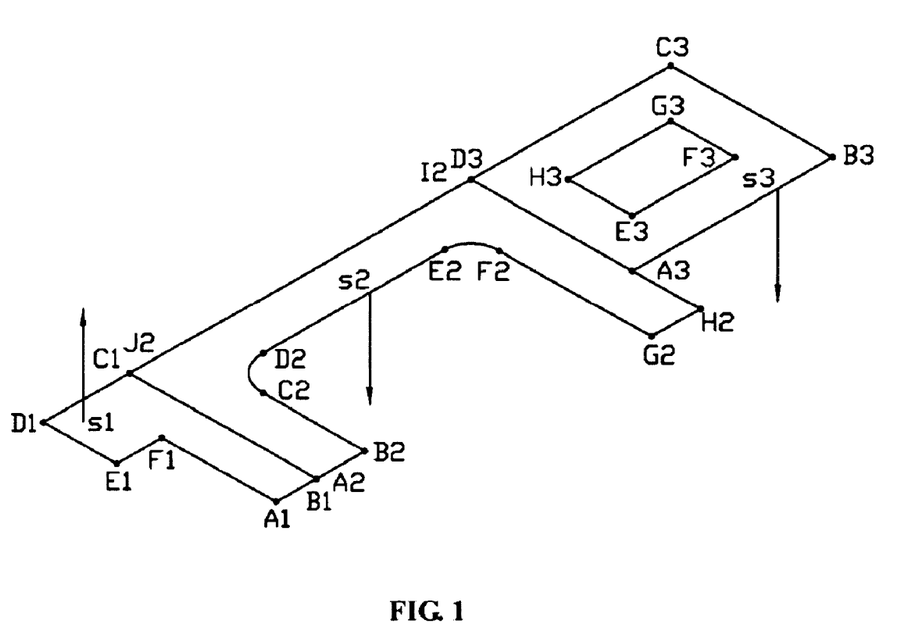
FIG. 1 illustrates one embodiment of a three-dimensional (3D) model comprising 3 surfaces, wherein surface normals to the 3 surfaces are inconsistent.

Generally speaking, a three-dimensional (3D) model of an object may comprise a plurality of surfaces, each of which is characterized by a surface normal pointing in a certain direction. It may be understood that a surface normal of a 3D model points either towards the exterior of the 3D model (called an outer-pointing normal), or towards the interior of the 3D model (called an inward-pointing normal). FIG. 1 illustrates one embodiment of a 3D model comprising 3 surfaces (shown as s1, s2, and s3). A surface normal to s1 (shown as an up arrow) points towards the exterior of the 3D model. Surface normals to s2 and s3 (shown as down arrows) point towards the interior of the 3D mode. Inconsistency of surface normals of a 3D model is inconvenient to certain applications such as surface detection, industrial design, motion control and reverse engineering.

What is needed, therefore, is a method for uniformizing surface normals of a 3D model so as to bring convenience to applications of 3D models such as surface detection, industrial design, motion control and reverse engineering.

DETAILED DESCRIPTION OF CERTAIN INVENTIVE EMBODIMENTS

As used herein, a vertex may be defined as a unique point in space. An edge may be defined as a finite, non-self-intersecting, directed space curve bounded by two vertices that are not necessarily distinct. A loop may be defined as a non-self-intersecting, piecewise, closed space curve, which may be a boundary of a face. A surface or face is defined as a finite connected, non-self-intersecting, region of a closed oriented surface bounded by one or more loops. Referring to FIG. 1, the three-dimensional (3D) model includes 3 surfaces, i.e. s1, s2, and s3. Surface s1 includes a loop, i.e. a closed boundary connected by vertices of A1, B1, C1, D1, E1, and F1. A curve starting with A1 and ending with B1, a curve starting with B1 and ending with C1, . . . , and a curve starting with F1 and ending with A1 are edges of s1. Likewise, s2 includes a loop, i.e. a closed boundary connected by vertices of J2, I2, H2, G2, F2, E2, D2, C2, B2, A2. A curve starting with A2 and ending with J2, a curve starting with J2 and ending with I2, . . . , and a curve starting with B2 and ending with A2 are edges of s2. Furthermore, s3 includes 2 loops, i.e. a closed boundary connected by vertices of D3, C3, B3, A3, and a closed boundary connected by vertices of H3, G3, F3, E3. A curve starting with A3 and ending with D3, a curve starting with D3 and ending with C3, . . . , a curve starting with E3 and ending with H3, . . . , and a curve starting with F3 and ending with E3 are edges of s3. It may be understood that the curve starting with B1 and ending with C1 is adjacent to the curve starting with A2 and ending with J2, and the curve starting with I2 and ending with H2 is adjacent to the curve starting with A3 and ending with D3.

Figure 2:
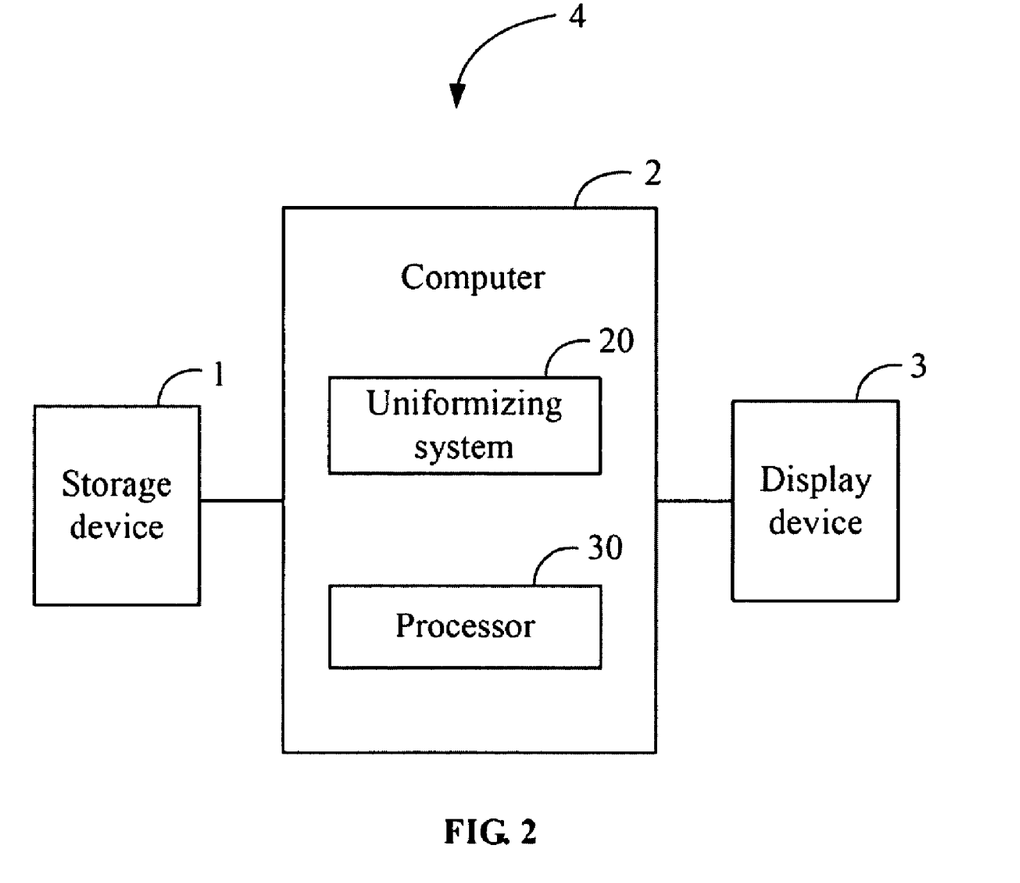
FIG. 2 is a block diagram of one embodiment of a system for uniformizing surface normals of a 3D model of the present disclosure.

FIG. 2 is a block diagram of one embodiment of a system 4 for uniformizing surfaces normal of a 3D model of the present disclosure. The system 4 may be used to uniformize surface normals to surfaces in a 3D model so that the surface normals are consistent. In one embodiment, the system 4 may include a storage device 1, a computer 2, and a display device 3. The storage device 1 is connected to the computer 2 and is used for storing data of a 3D model, such as parametric equations of surfaces. The computer 2 includes a uniformizing system 20. The storage device 1 may include non-transitory computer-readable storage medium, such as a hard disk drive, a compact disc, a digital video disc, or a tape drive. The storage device 1 stores computerized codes of the function modules of the uniformizing system 20. In one embodiment, the uniformizing system 20 is configured for receiving data of a 3D model comprising a plurality of surfaces from the storage device 1, and determining one or more surfaces to which surface normals are inconsistent (upside down) with a surface normal to a predetermined reference surface (hereinafter, "the inconsistent surfaces") from the plurality of surfaces. The uniformizing system 20 is further configured for reversing the inconsistent surface normals, and storing the 3D model into the storage device 1. One or more specialized or general purpose processors, such as a processor 30 included in the computer 2, may be used to execute the uniformizing system 20.

It may be understood that the predetermined reference surface may be one surface comprised by the 3D model. As shown in FIG. 1, a surface normal to s1 points in a first direction away from the 3D model, surface normals to s2 and s3 point in a second direction of the 3D model opposite to the first direction. If s1 is a predetermined reference surface, then the surface normals to s2 and s3 are inconsistent with the surface normals to s1, and need to be reversed. If s2 is a predetermined reference surface, then the surface normal to s1 is inconsistent with the surface normal to s2, and needs to be reversed.

Figure 3:
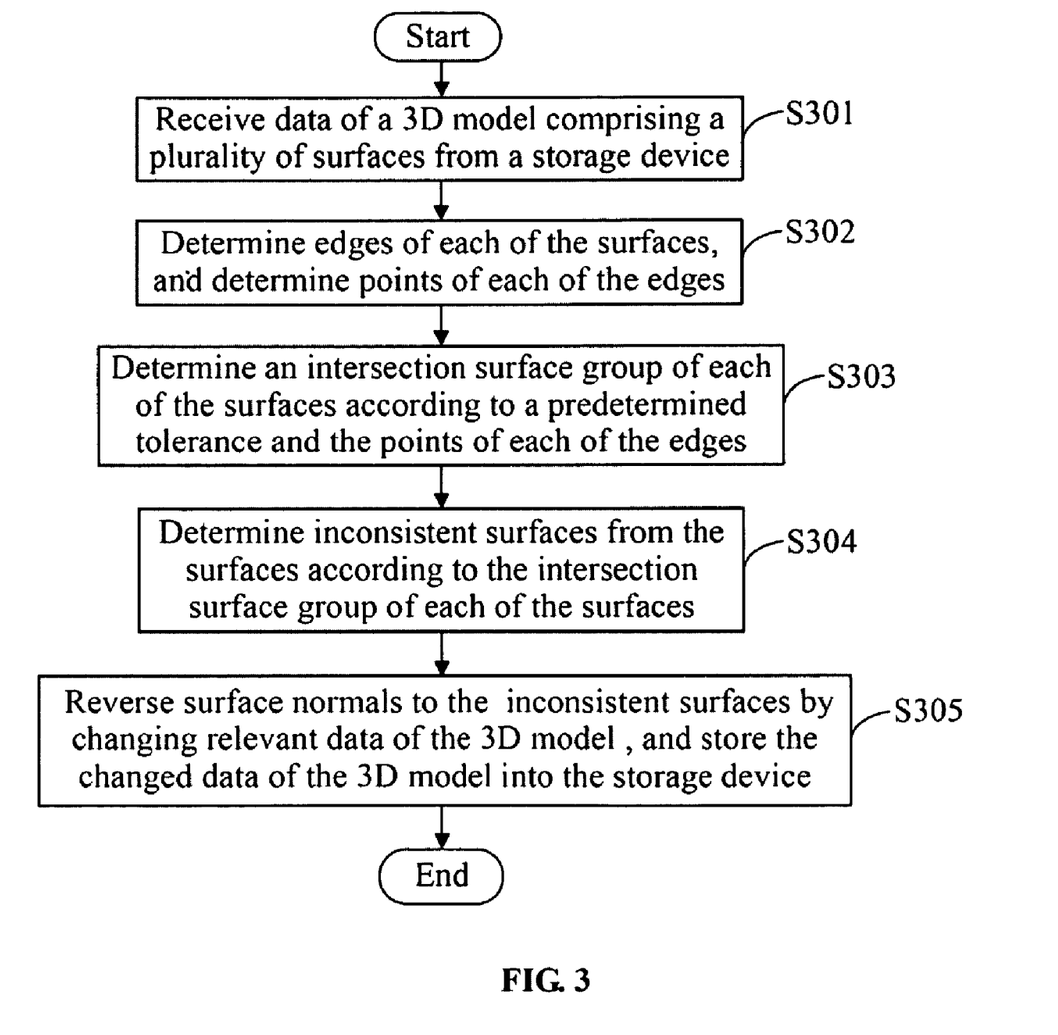
FIG. 3 is a flowchart of one embodiment of a method for uniformizing surface normals of a 3D model.

FIG. 3 is a flowchart of one embodiment of a method for uniformizing surface normals. The method of FIG. 3 may be used to uniformize inconsistent surface normals to surfaces in a 3D model so that the surface normals are consistent and finally store changed data of 3D model in a storage device. Depending on the embodiments, additional blocks may be added, others removed, and the ordering of the blocks may be changed.

In block S301, the uniformizing system 20 receives data of a 3D model comprising a plurality of surfaces from a storage device, such as the storage device 1 showed in FIG. 1, and displays the 3D model on a display device, such as the display device 3 showed in FIG. 1. The 3D model includes a parametric equation of each surface of the 3D model. An area of each surface and a parametric equation of each edge of the surfaces may be derived from the parametric equation of the surface. A length of each edge may be derived from the parametric equation of the edge.

In block S302, the uniformizing system 20 determines edges of each of the plurality of surfaces, and determines points of each of the edges. In one example with respect to FIG. 1, s1 comprises 6 edges, s2 comprises 10 edges, and s3 comprises 8 edges. Parametric equations of edges of s1 may be derived from a parametric equation of s1, and lengths of edges of s1 may be derived from the parametric equations of edges of s1. Likewise, parametric equations of edges of s2 may be derived from a parametric equation of s2, and lengths of edges of s2 may be derived from the parametric equations of edges of s2. Parametric equations of edges of s3 may be derived from a parametric equation of s3, and lengths of edges of s3 may be derived from the parametric equations of edges of s3. The uniformizing system 20 determines points of each of the edges by sampling points from the edges.

It may be understood that each point in a 3D model has unique 3D coordinates which may be in x,y,z form corresponding to XYZ coordinate system. In one embodiment, if a nearest distance between two surfaces is less than or equal to the tolerance, then the two surfaces intersect with each other. Otherwise, if a nearest distance between two surfaces is greater than the tolerance, then the two surfaces do not intersect with each other. A nearest distance between two surfaces may be defined as a nearest distance between edges of two surfaces. In one example with respect to FIG. 1, s1 comprises 6 edges, s2 comprises 10 edges. Assuming $A(a0,a1,a2)$ is a point in one edge of s1, and $B(b0,b1,b2)$ is a point in one edge of s2, a distance between A and B may be defined as $|AB|=\sqrt{(a0-b0)^2+(a1-b1)^2+(a2-b2)^2}$. For any points A' and B', wherein A' is a point in one edge of s1, and B' is a point in one edge of s2, if a distance between A' and B', i.e. $|A'B'|$ is greater than or equal to $|AB|$, then $|AB|$ is the nearest distance between s1 and s2, and A and B are nearest points between s1 and s2. Moreover, if A belongs to a first edge, and B belongs to a second edge, then A is called a nearest point of the first edge, and B is called a nearest point of the second edge. Assuming that the tolerance is 2, if a nearest distance between two surfaces is less than or equal to 2, then it can be concluded that the two surfaces intersect with each other. Otherwise, if a nearest distance between two surfaces is greater than 2, then the two surfaces do not intersect with each other.

In block S303, the uniformizing system 20 determines an intersection surface group for each of the plurality of surfaces according to a predetermined tolerance and the points of each of the edges. In one example with respect to FIG. 1, if s1, s2, and s3 are the surfaces, the uniformizing system 20 may determine that s2 is an intersection surface of s1, s1 and s3 are intersection surfaces of s2, and s2 is an intersection surface of s3. In other words, an intersection surface group of s1 comprises s2, an intersection surface group of s2 comprises s1 and s3, and an intersection surface group of s3 comprises s2. In one embodiment, an intersection surface group of each of the surfaces may be represented by an array. Further details of block S304 are described in FIG. 4.

In block S304, the uniformizing system 20 determines one or more inconsistent surfaces from the plurality of surfaces according to the intersection surface group of each of the plurality of surfaces. In one embodiment, the uniformizing system 20 respectively selects a reference surface and an intersection surface of the reference surface, and determines if there are an intersection edge and a nearest point of the reference surface, and there are an intersection edge and a nearest point of the intersection surface of the reference surface. If there are an intersection edge and a nearest point of the reference surface, and there are an intersection edge and a nearest point of the intersection surface of the reference surface, then the uniformizing system 20 further determines if the intersection surface of the reference surface is an inconsistent surface. Further details of block S304 are described in FIG. 6.

In block S305, the uniformizing system 20 reverses surface normals to the inconsistent surfaces by changing relevant data of the 3D model, and stores the changed data of the 3D model into the storage device 1 and display the 3D model on the display device 3.

Figure 4:
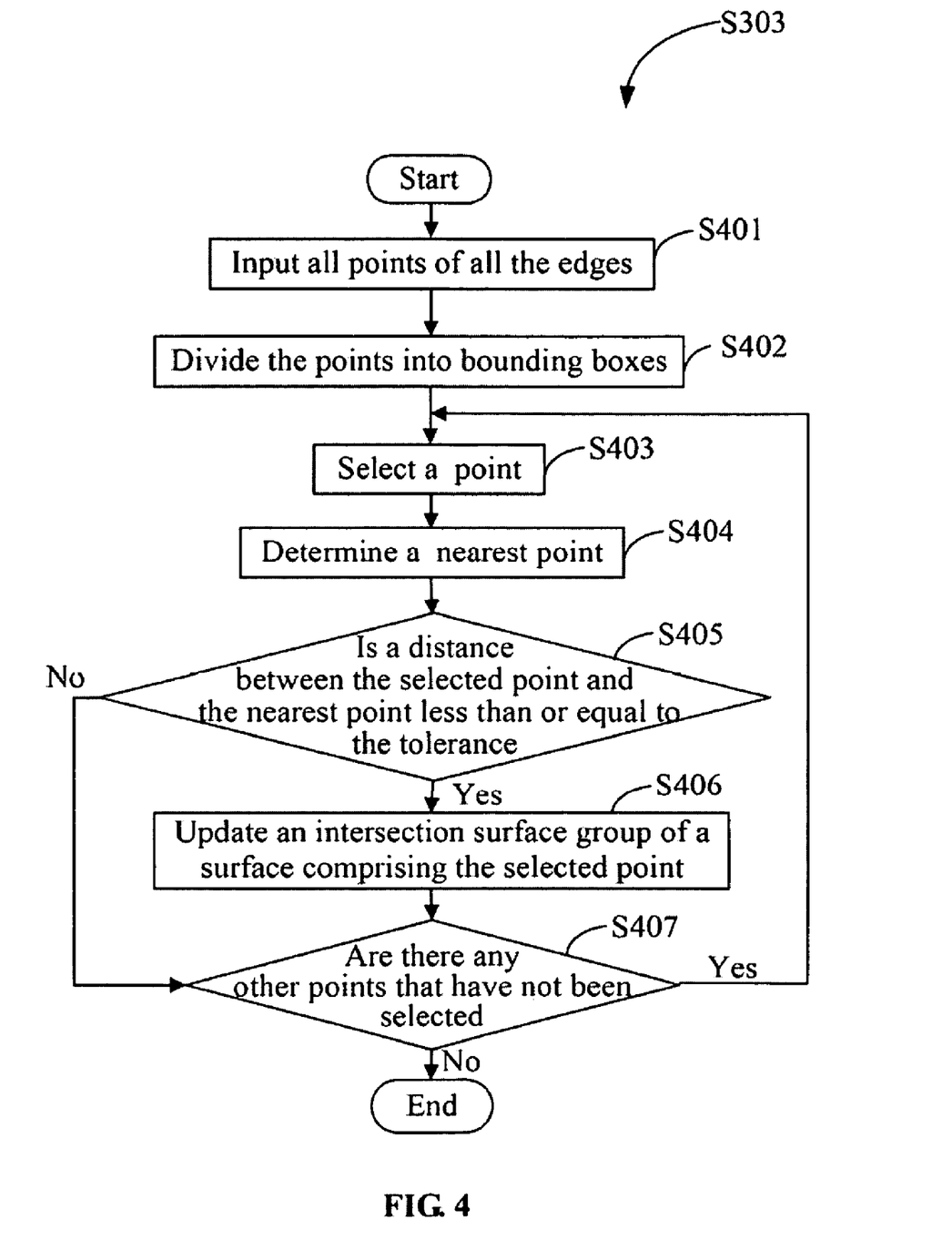
FIG. 4 is a detailed flowchart illustrating one embodiment of determining an intersection surface group of each of the surfaces according to the tolerance and points of each of the edges (block S303 in FIG. 3)

FIG. 4 is a detailed flowchart illustrating one embodiment of determining an intersection surface group of each of the plurality of surfaces according to the tolerance and points of each of the edges (block S303 in FIG. 3). In block S401, the uniformizing system 20 inputs all points of all edges of the surfaces.

Figure 8:
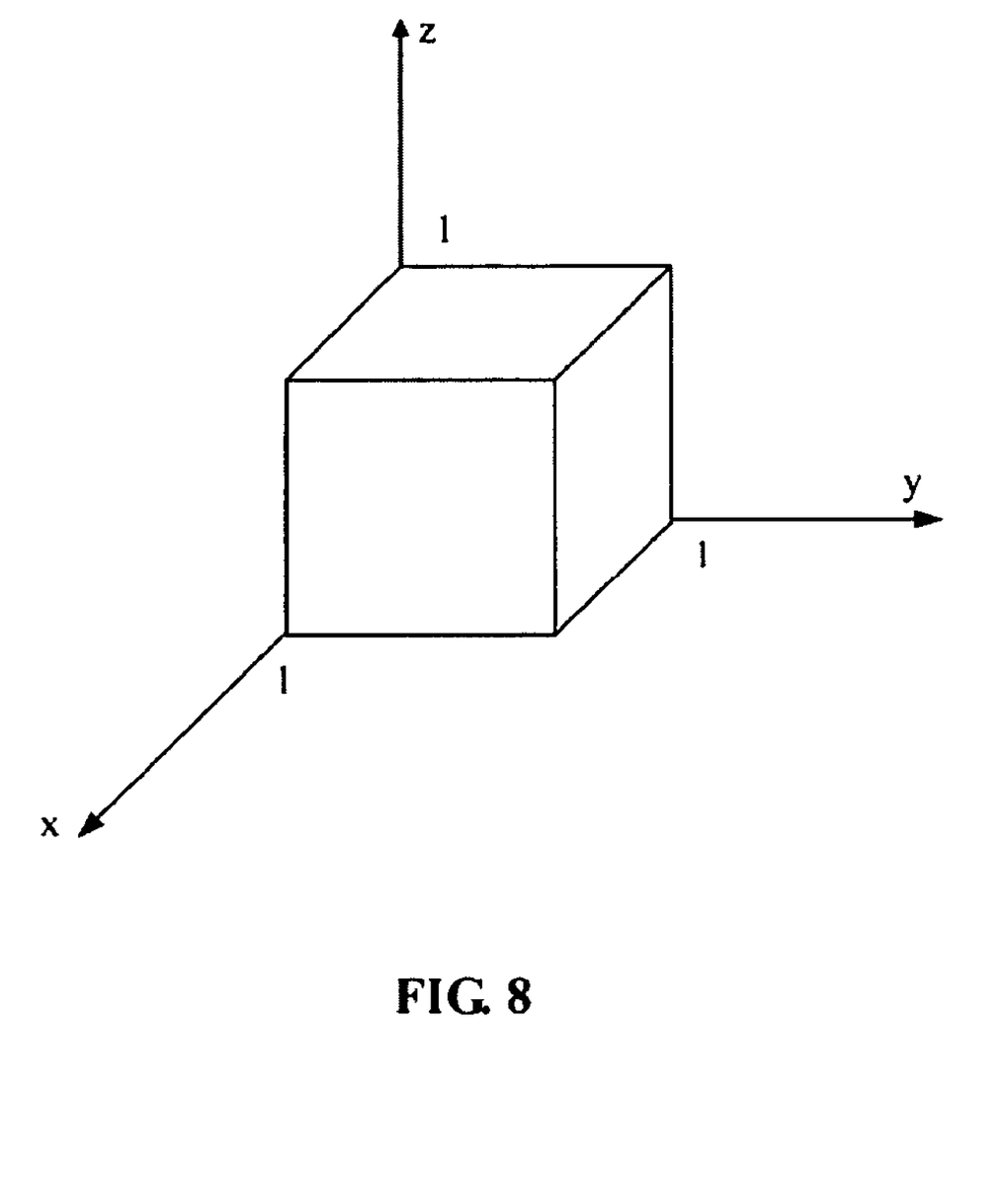
FIG. 8 illustrates one embodiment of an axis-aligned bounding box.

In block S402, the uniformizing system 20 divides the points into a series of boxes (hereinafter, "the bounding boxes") according to 3D coordinates of the points. It may be understood that a bounding box for one or more points is a volume wrapping the one or more points. In one embodiment, each of the bounding boxes may be an axis-aligned bounding box, each edge of which is parallel to the X-axis, Y-axis, or Z-axis of a 3D coordinate system. FIG. 8 illustrates one embodiment of an axis-aligned bounding box. The axis-aligned bounding box has vertices of (0,0,0), (0,1,0), (1,0,0), (1,1,0), (0,0,1), (0,1,1), (1,0,1), and (1,1,1).

Firstly, the uniformizing system 20 determines a bounding box wrapping all the points. It may be understood that an axis-aligned bounding box may be determined by a minimal coordinate and a maximal coordinate of the one or more points for each axis direction (i.e. X-axis, Y-axis, and Z-axis). In one particular example, x_min and x_max respectively denote a minimal coordinate and maximal coordinate of the points for X-axis, y_min and y_max respectively denote a minimal coordinate and maximal coordinate of the points for Y-axis, and z_min and z_max respectively denote a minimal coordinate and maximal coordinate of the points for Z-axis. Accordingly, a bounding box wrapping all the points may be represented by (x_min, x_max, y_min, y_max, z_min, z_max).

Secondly, the uniformizing system 20 divides the bounding box into sub bounding boxes each of which wraps approximately same amount of the points. In one embodiment, the bounding box may be divided into sub bounding boxes by projecting the points onto X-axis, Y-axis and Z-axis. If a point is wrapped by a sub bounding box, then the uniformizing system 20 divides the point into the sub bounding box. In one example, each sub bounding box wraps approximately one point.

In block S403, the uniformizing system 20 selects a point from the points.

In block S404, the uniformizing system 20 determines a nearest point to the selected point from the points, such that the nearest point is not in a surface comprising the selected point, and a surface comprising the nearest point is not an intersection surface of the surface comprising the selected point. Further details of block S404 are described in FIG. 5.

In block S405, the uniformizing system 20 determines if a distance between the selected point and the nearest point is less than or equal to the tolerance. If the distance is greater than the tolerance, then the flow may move to block S407.

Otherwise, if the distance is less than or equal to the tolerance, in block S406, then the uniformizing system 20 determines that the surface comprising the selected point intersects with the surface comprising the nearest point, and updates an intersection surface group of the surface comprising the selected point. It may be understood that if a surface comprising the nearest point is not in the intersection surface group of the surface comprising the selected point, then the surface comprising the nearest point is added into the intersection surface group of the surface comprising the selected point.

In block S407, the uniformizing system 20 determines if there are any other points that have not been selected. If there are any other points that have not been selected, then the flow may return to block S403.

Figure 5:
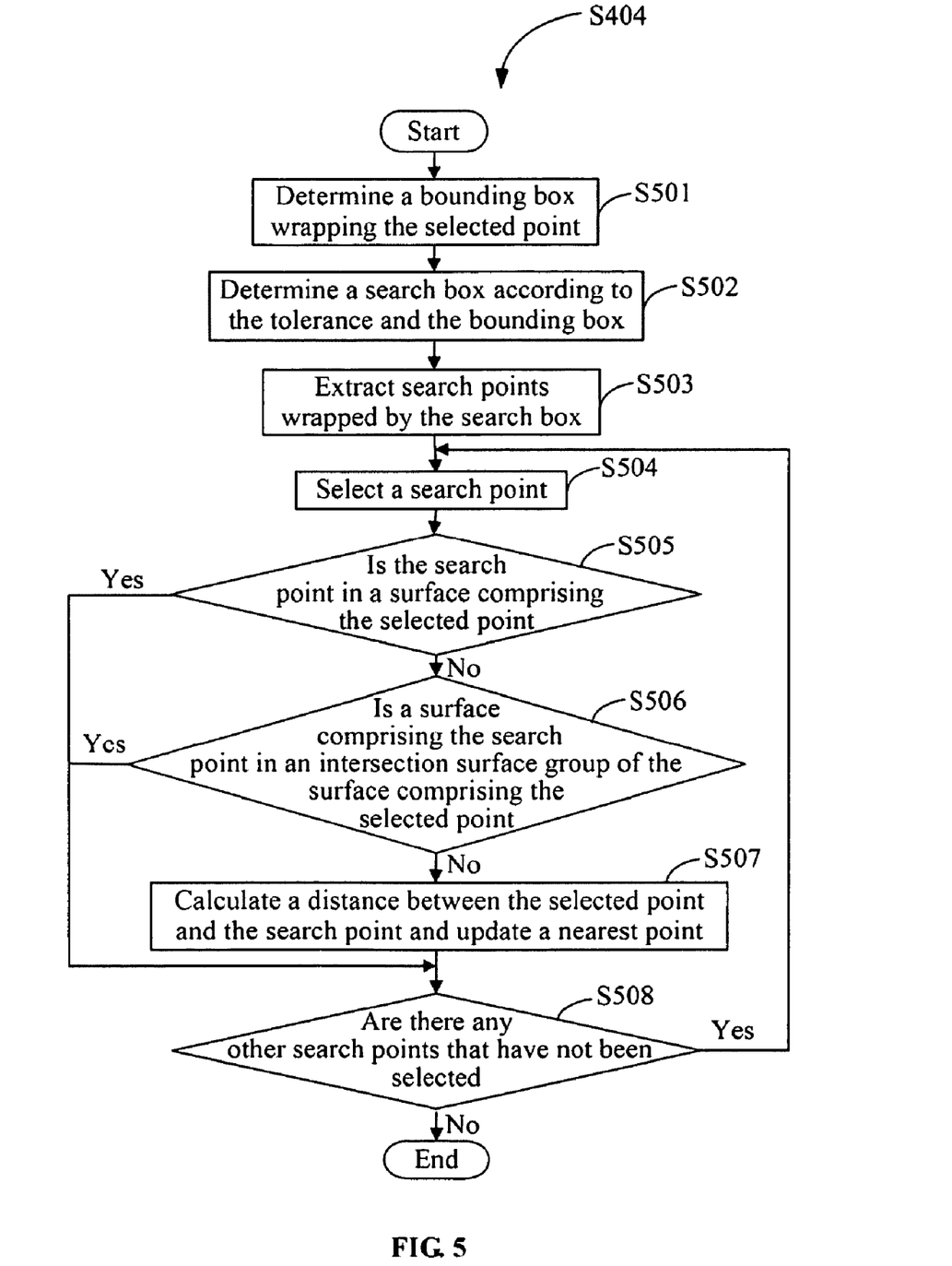
FIG. 5 is a detailed flowchart illustrating one embodiment of determining a nearest point to a selected point (block S404 in FIG. 4)

FIG. 5 is a detailed flowchart illustrating one embodiment of determining a nearest point to the selected points (block S404 in FIG. 4). In block S501, the uniformizing system 20 determines a bounding box wrapping the selected point.

In block S502, the uniformizing system 20 determines a bounding box for searching the nearest point (hereinafter, "the search box") according to the tolerance and the sub bounding box wrapping the selected point. It may be understood that the search scope of the nearest point is limited to the points wrapped by the search box. In one embodiment, assuming that each sub bounding box is a cube, the uniformizing system 20 determines a search box by extending N layers of sub bounding boxes with a center of the sub bounding box wrapping the selected point, wherein N may be determined according to the tolerance and a side length of a sub bounding box. Accordingly, the search box comprises $(N+1)^2$ sub bounding boxes. For example, if the tolerance is 2, and a side length of a sub bounding box is 0.5, then N=4. Correspondingly, the search box comprises 25 sub bounding boxes.

In block S503, the uniformizing system 20 extracts the points wrapped by the search boxes (hereinafter, "the search points"). In one example, the search points may be represented by an array.

In block S504, the uniformizing system 20 selects a search point.

In block S505, the uniformizing system 20 determines if the search point is in the surface comprising the selected point. If the search point is in the surface comprising the selected point, then the flow may move to block S508.

Otherwise, if the search point is not in the surface comprising the selected point, in block S506, then the uniformizing system 20 determines if a surface comprising the search point is comprised by an intersection surface group of the surface comprising the selected point. If the surface comprising the search point is not comprised by an intersection surface group of the selected point, in block S507, then the uniformizing system 20 calculates a distance between the selected point and the search point and updates a nearest point. It may be understood that if the distance between the selected point and the search point is less than a distance between the selected point and a last nearest point, then the search point is selected as a nearest point.

Otherwise, if the surface comprising the search point is comprised by the intersection surface group of the selected point, in block S508, then the uniformizing system 20 determines if there are any other search points that have not been selected. If there are any other search points that have not been selected, then the flow may return to block S504.

Figure 6:
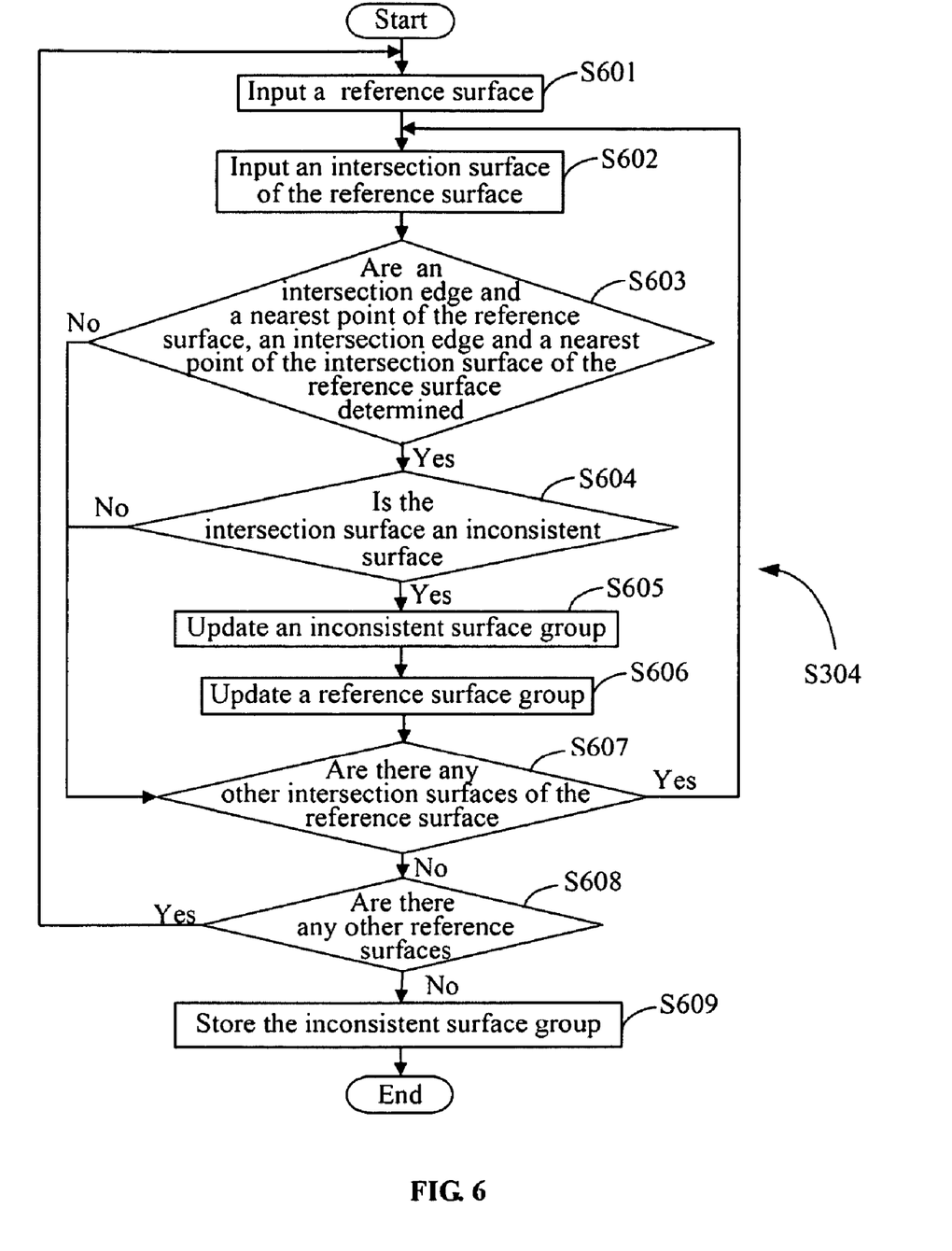
FIG. 6 is a detailed flowchart illustrating one embodiment of determining one or more inconsistent surfaces from the surfaces according to the intersection surface group of each of the surfaces (block S304 in FIG. 3)

FIG. 6 is a detailed flowchart illustrating one embodiment of determining one or more inconsistent surfaces from the surfaces according to the intersection surface group of each of the surfaces (block S304 in FIG. 3). In block S601, the uniformizing system 20 inputs a reference surface from a reference surface group. It may be understood that a reference surface group may be used for storing reference surfaces for determining the inconsistent surfaces, and the inconsistent surface group is used for storing the inconsistent surfaces. It may be further understood that there is only one reference surface, i.e. the predetermined reference surface determined by a user in the reference surface group at first. In one embodiment, the reference surface group may be represented by an array, and the inconsistent surface group may also be represented by an array.

In block S602, the uniformizing system 20 inputs an intersection surface of the reference surface.

In block S603, the uniformizing system 20 determines an intersection edge and a nearest point of the reference surface, an intersection edge and a nearest point of the intersection surface of the reference surface, and the flow may move to block S604. If there are not an intersection edge and a nearest point of the reference surface, and an intersection edge and a nearest point of the intersection surface of the reference surface, then the flow may move to block S607. Further details of block S603 are described with respect to FIG. 7.

In block S604, the uniformizing system 20 determines if the intersection surface of the reference surface is an inconsistent surface according to the intersection edge and the nearest point of the reference surface, and the intersection edge and the nearest point of the intersection surface of the reference surface. If the intersection surface of the reference surface is not an inconsistent surface, then the flow may move to block S607. In one embodiment, the uniformizing system 20 determines if the intersection surface of the reference surface is an inconsistent surface by comparing a normal to the nearest point of the reference surface in a corresponding edge to a normal to the nearest point of the intersection surface of the reference surface in a corresponding edge. It may be understood that if a normal to the nearest point of the reference surface in a corresponding edge points to a same direction as a normal to the nearest point of the intersection surface of the reference surface in a corresponding edge, and the reference intersection is not an inconsistent surface, or if a normal to the nearest point of the reference surface in a corresponding edge points to an opposite direction with a normal to the nearest point of the intersection surface of the reference surface in a corresponding edge, and the reference intersection is an inconsistent surface, then the intersection surface of the reference surface is an inconsistent surface.

In block S605, if the intersection surface of the reference surface is an inconsistent surface, then the uniformizing system 20 updates the inconsistent surface group. It may be understood if the intersection surface of the reference surface is not comprised by the inconsistent surface group, then the uniformizing system 20 adds the intersection surface of the reference surface into the inconsistent surface group.

In block S606, the uniformizing system 20 updates the reference surface group. It may be understood that if the intersection surface of the reference surface is not comprised by the reference surface group, then the uniformizing system 20 adds the intersection surface of the reference surface into the reference surface group.

In block S607, the uniformizing system 20 determines if there are any other intersection surface of the reference surfaces that have not been inputted. If there are any other intersection surfaces of the reference surface that have not been inputted, then the flow may return to S602.

In block S608, the uniformizing system 20 determines if there are any other reference surfaces that have not been inputted. If there are any other reference surfaces that have not been inputted, then the flow may return to block S601.

In block S609, the uniformizing system 20 stores the inconsistent surface group into the storage device 1.

Figure 7:
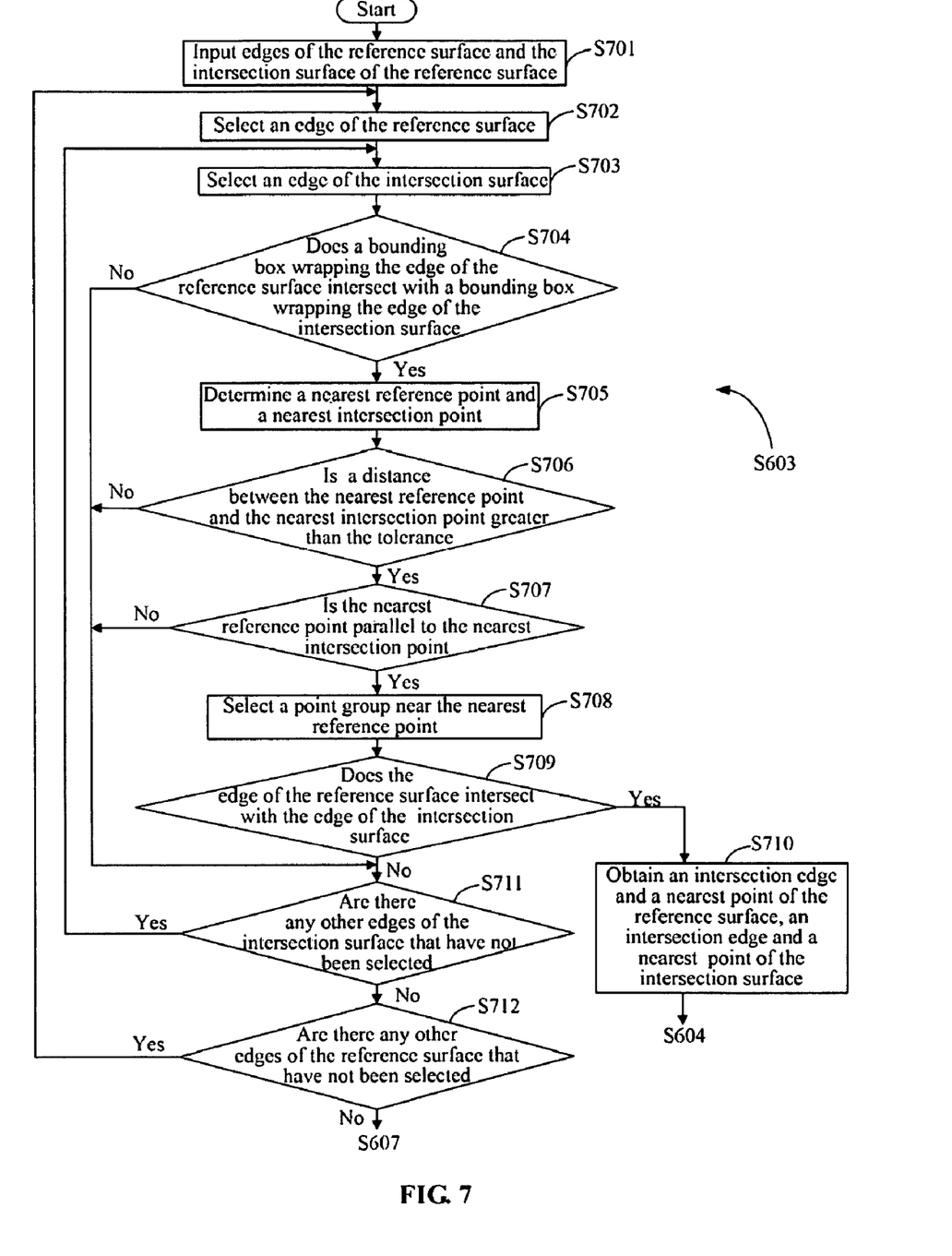
FIG. 7 is a detailed flowchart illustrating one embodiment of determining if an intersection edge and a nearest point of a reference surface, an intersection edge and a nearest point of an intersection surface of the reference surface are obtained (block S603 in FIG. 6)

FIG. 7 is a detailed flowchart illustrating one embodiment of determining if an intersection edge and a nearest point of a reference surface, an intersection edge and a nearest point of an intersection surface of the reference surface are obtained (block S603 in FIG. 6). In block S701, the uniformizing system 20 inputs edges of the reference surface and the intersection surface of the reference surface.

In block S702, the uniformizing system 20 selects an edge of the reference surface.

In block S703, the uniformizing system 20 selects an edge of the intersection surface of the reference surface, such as e7.

In block S704, the uniformizing system 20 determines if a bounding box wrapping the edge of the reference surface intersects with another bounding box wrapping the edge of the intersection surface of the reference surface. If a bounding box wrapping the edge of the reference surface does not intersect with another bounding box wrapping the edge of the intersection surface of the reference surface, then the flow may move to block S711.

Otherwise, if a bounding box wrapping the edge of the reference surface intersects with another bounding box wrapping the edge of the intersection surface of the reference surface, in block S705, then the uniformizing system 20 determines a nearest reference point and a nearest intersection point. It may be understood that the nearest reference point is on the edge of the reference surface, the nearest intersection point is on the edge of the intersection surface of the reference surface, and a nearest distance between the edge of the reference surface and the edge of the intersection surface of the reference surface is determined by the nearest reference point and the nearest intersection point.

In block S706, the uniformizing system 20 determines if a distance between the nearest reference point and the nearest intersection point is greater than the tolerance. If the distance between the nearest reference point and the nearest intersection point is greater than the tolerance, then the flow may move to block S711.

Otherwise, if the distance between the nearest reference point and the nearest intersection point is not greater than the tolerance, in block S707, then the uniformizing system 20 determines if the nearest reference point is parallel to the nearest intersection point. If the nearest reference point is parallel to the nearest intersection point, then the flow may move to block S711. It may be understood that if a normal to the nearest reference point in a corresponding edge is parallel to the nearest intersection point in a corresponding edge, then the nearest reference point is called parallel to the nearest intersection point.

Otherwise, if the nearest reference point is not parallel to the nearest intersection point, in block S708, then the uniformizing system 20 selects a point group near the nearest reference point. In one example, the uniformizing system 20 selects 20 points near the nearest point of the reference surface. In another example, the uniformizing system 20 selects a point group according to a length of the edge of the reference surface and a length of the edge of the intersection surface of the reference surface.

In block S709, the uniformizing system 20 determines if the edge of the reference surface intersects with the edge of the intersection surface of the reference surface according to the point group. If the edge of the reference surface does not intersect with the edge of the intersection surface of the reference surface, then the flow may move to block S711. In one embodiment, if a number of points from the point group that near enough to the edge of the intersection surface of the reference surface is greater than or equal to a predetermined number, such as 5, then the edge of the reference surface intersects with the edge of the intersection surface of the reference surface. It may be understood that if a difference between a distance from a point from the point group to the edge of the intersection surface of the reference surface and the nearest distance is less than a predetermined number, such as 0.01, then the point is near enough to the edge of the intersection surface of the reference surface.

If the edge of the reference surface intersects with the edge of the intersection surface of the reference surface, in block S710, then the uniformizing system 20 selects the edge of the reference surface as an intersection edge of the reference surface, selects the edge of the intersection surface of the reference surface as an intersection edge of the intersection surface of the reference surface, selects the nearest reference point as a nearest point of the reference surface, and selects the nearest intersection point as a nearest point of the intersection surface of the reference surface.

In block S711, the uniformizing system 20 determines if there are any other edges of the intersection surface of the reference surface that have not been selected. If there are any other edges of the intersection surface of the reference surface that have not been selected, then the flow may return to block S703.

In block S712, the uniformizing system 20 determines if there are any other edges of the reference surface that have not been selected. If there are any other edges of the reference surface that have not been selected, then the flow may return to block S702.

Figure 9:
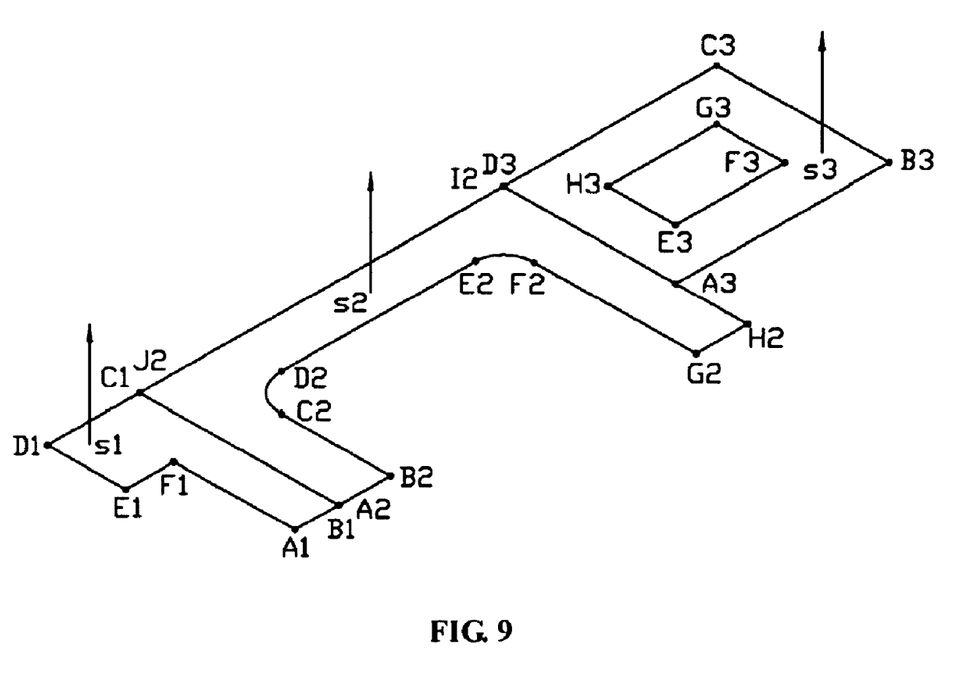
FIG. 9 illustrates one embodiment of a 3D model comprising 3 surfaces, wherein surface normals to the 3 surfaces are consistent after execution of the system.

FIG. 9 illustrates one embodiment of a 3D model comprising 3 surfaces, wherein surface normals to the 3 surfaces are consistent as a result of using the uniformizing system 20 as described above. In FIG. 9, surface normals to s1, s2 and s3 (shown as up arrows) all point outward from the 3D model.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for uniformizing surface normals of a three-dimensional (3D) model, the method comprising:
    (a) receiving data of the 3D model comprising a plurality of surfaces of the 3D model from a storage device of a computing system;
    (b) determining edges of each of the plurality of surfaces, and determining coordinate points of each of the edges;
    (c) determining an intersection surface group of each of the plurality of surfaces according to a predetermined tolerance and the coordinate points of each of the edges;
    (d) determining one or more inconsistent surfaces from the plurality of surfaces according to the intersection surface group of each of the plurality of surfaces and a predetermined reference surface, wherein the inconsistent surfaces are the surfaces to which surface normals are inconsistent with a surface normal to the predetermined reference surface, and wherein block (d) comprises:
- (d1) inputting a reference surface from a reference surface group;
- (d2) inputting an intersection surface of the reference surface;
- (d3) checking if an intersection edge and a nearest point of the reference surface, an intersection edge and a nearest point of the intersection surface of the reference surface are determined;
- (d4) determining if the intersection surface of the reference surface is an inconsistent surface according to the intersection edge and the nearest point of the reference surface, and the intersection edge and the nearest point of the intersection surface of the reference surface upon condition that an intersection edge and a nearest point of the reference surface, an intersection edge and a nearest point of the intersection surface of the reference surface are determined;
- (d5) updating an inconsistent surface group if the intersection surface of the reference surface is an inconsistent surface;
- (d6) repeating from block (d2) to block (d5) upon condition that there are one or more intersection surfaces of the reference surface that have not been input;
- (d7) repeating from block (d1) to block (d6) upon condition that there are one or more reference surfaces that have not been input; and
- (d8) storing the one or more inconsistent surfaces into the storage device; and (e) reversing surface normals to the one or more inconsistent surfaces by changing relevant data of the 3D model, and storing the changed data of the 3D model into the storage device.

2. The method as claimed in claim 1, wherein block (c) comprises:
- (c1) selecting a point from the points of each of the edges;
- (c2) determining a nearest point nearest to the selected point from the points of each of the edges, wherein the nearest point is not in a surface comprising the selected point, and a surface comprising the nearest point is not in an intersection surface group of the surface comprising the selected point;
- (c3) updating the intersection surface group of the surface comprising the selected point upon condition that a distance between the selected point and the nearest point is less than or equal to the tolerance; and
- (c4) repeating from block (c1) to block (c3) upon condition that there are one or more points that have not been selected.

3. The method as claimed in claim 2, wherein block (c2) comprises:
- (c21) determining search points from the points of each of the edges;
- (c22) selecting a search point from the determined search points;
- (c23) calculating a distance between the selected point and the determined search point and updating a nearest point nearest to the selected point upon condition that the determined search point is not in a surface comprising the selected point and a surface comprising the determined search point is not in an intersection surface group of the surface comprising the selected point; and
- (c24) repeating from block (c21) to block (c23) upon condition that there are one or more search points that have not been selected.

4. The method as claimed in claim 3, wherein in block (c21) the determined search points are determined as follows:
- determining a bounding box wrapping the selected point;
- determining a search box according to the determined bounding box; and
- extracting the points wrapped by the search boxes as determined search points.

5. The method as claimed in claim 1, wherein block (d3) comprises:
- (d301) selecting an edge of the reference surface;
- (d302) selecting an edge of the intersection surface of the reference surface;
- (d303) determining if a bounding box wrapping the edge of the reference surface intersects with a bounding box wrapping the edge of the intersection surface of the reference surface;
- (d304) determining a nearest reference point and a nearest intersection point upon condition that a bounding box wrapping the edge of the reference surface intersects with a bounding box wrapping the edge of the intersection surface of the reference surface;
- (d305) moving to block (d309) upon condition that a distance between the nearest reference point and the nearest intersection point is greater than the tolerance; or
- (d306) selecting a group of points near the nearest reference point upon condition that a distance between the nearest reference point and the nearest intersection point is less than or equal to the tolerance, and the nearest reference point is parallel to the nearest intersection point;
- (d307) determining if the edge of the reference surface intersects with the edge of the intersection surface of the reference surface according to the group of points;
- (d308) selecting the edge of the reference surface as an intersection edge of the reference surface, selecting the edge of the intersection surface of the reference surface as an intersection edge of the intersection surface of the reference surface, selecting the nearest reference point as a nearest point of the reference surface, and selecting the nearest intersection point as a nearest point of the intersection surface of the reference surface upon condition that the edge of the reference surface intersects with the edge of the intersection surface of the reference surface;
- (d309) going to block (d302) upon condition that there are one or more edges of the intersection surface of the reference surface that have not been selected; and
- (d310) going to block (d301) upon condition that there are one or more edges of the reference surface that have not been selected.

6. The method as claimed in claim 5, wherein block (d307) comprises:
- determining that the edge of the reference surface intersects with the edge of the intersection surface of the reference surface upon condition that a number of points from the point group is greater than or equal to a predetermined number, wherein each of the points from the point group is within a predetermined distance to the edge of the intersection surface of the reference surface.

7. The method as claimed in claim 1, wherein block (d4) comprises:
- determining that the intersection surface of the reference surface is an inconsistent surface upon condition that:

(1) a normal to the nearest point of the reference surface in a corresponding edge points to a same direction as a normal to the nearest point of the intersection surface of the reference surface in a corresponding edge, and the reference intersection is not an inconsistent surface; or (2) a normal to the nearest point of the reference surface in a corresponding edge points to an opposite direction with a normal to the nearest point of the intersection surface of the reference surface in a corresponding edge, and the reference intersection is an inconsistent surface.

8. A non-transitory computer-readable medium having stored thereon instructions for uniformizing surface normals, the instructions performing blocks comprising:

(a) receiving data of a 3D model comprising a plurality of surfaces of the 3D model from a storage device of a computing system;

(b) determining edges of each of the plurality of surfaces, and determining coordinate points of each of the edges;

(c) determining an intersection surface group of each of the plurality of surfaces according to a predetermined tolerance and the coordinate points of each of the edges;

(d) determining one or more inconsistent surfaces from the plurality of surfaces according to the intersection surface group of each of the plurality of surfaces and a predetermined reference surface, wherein the inconsistent surfaces are the surfaces to which surface normals are inconsistent with a surface normal to the predetermined reference surface, and wherein block (d) comprises:

(d1) inputting a reference surface from a reference surface group;

(d2) inputting an intersection surface of the reference surface;

(d3) checking if an intersection edge and a nearest point of the reference surface, an intersection edge and a nearest point of the intersection surface of the reference surface are determined;

(d4) determining if the intersection surface of the reference surface is an inconsistent surface according to the intersection edge and the nearest point of the reference surface, and the intersection edge and the nearest point of the intersection surface of the reference surface upon condition that an intersection edge and a nearest point of the reference surface, an intersection edge and a nearest point of the intersection surface of the reference surface are determined;

(d5) updating an inconsistent surface group if the intersection surface of the reference surface is an inconsistent surface;

(d6) repeating from block (d2) to block (d5) upon condition that there are one or more intersection surfaces of the reference surface that have not been input;

(d7) repeating from block (d1) to block (d6) upon condition that there are one or more reference surfaces that have not been input; and (d8) storing the one or more inconsistent surfaces into the storage device; and (e) reversing surface normals to the one or more inconsistent surfaces by changing relevant data of the 3D model, and storing the changed data of the 3D model into the storage device.

9. The computer-readable medium as claimed in claim 8, wherein block (c) comprises:

(c1) selecting a point from the points of each of the edges;

(c2) determining a nearest point nearest to the selected point from the points of each of the edges, wherein the nearest point is not in a surface comprising the selected point, and a surface comprising the nearest point is not in an intersection surface group of the surface comprising the selected point;

(c3) updating the intersection surface group of the surface comprising the selected point upon condition that a distance between the selected point and the nearest point is less than or equal to the tolerance; and (c4) repeating from block (c1) to block (c3) upon condition that there are one or more points that have not been selected.

10. The computer-readable medium as claimed in claim 9, wherein block (c2) comprises:

(c21) determining search points from the points of each of the edges;

(c22) selecting a search point from the determined search points;

(c23) calculating a distance between the selected point and the determined search point and updating a nearest point nearest to the selected point upon condition that the determined search point is not in a surface comprising the selected point and a surface comprising the determined search point is not in an intersection surface group of the surface comprising the selected point; and (c24) repeating from block (c21) to block (c23) upon condition that there are one or more search points that have not been selected.

11. The computer-readable medium as claimed in claim 9, wherein in block (c21) the search points are determined as follows:

determining a bounding box wrapping the selected point;
determining a search box according to the determined bounding box; and
extracting the points wrapped by the search boxes as determined search points.

12. The computer-readable medium as claimed in claim 8, wherein block (d3) comprising:

(d301) selecting an edge of the reference surface;

(d302) selecting an edge of the intersection surface of the reference surface;

(d303) determining if a bounding box wrapping the edge of the reference surface intersects with a bounding box wrapping the edge of the intersection surface of the reference surface;

(d304) determining a nearest reference point and a nearest intersection point upon condition that a bounding box wrapping the edge of the reference surface intersects with a bounding box wrapping the edge of the intersection surface of the reference surface;

(d305) moving to block (d309) upon condition that a distance between the nearest reference point and the nearest intersection point is greater than the tolerance; or (d306) selecting a group of points near the nearest reference point upon condition that a distance between the nearest reference point and the nearest intersection point is less than or equal to the tolerance, and the nearest reference point is parallel to the nearest intersection point;

(d307) determining if the edge of the reference surface intersects with the edge of the intersection surface of the reference surface according to the group of points;

(d308) selecting the edge of the reference surface as an intersection edge of the reference surface, selecting the edge of the intersection surface of the reference surface as an intersection edge of the intersection surface of the reference surface, selecting the nearest reference point as a nearest point of the reference surface, and selecting the nearest intersection point as a nearest point of the intersection surface of the reference surface upon condition that the edge of the reference surface intersects with the edge of the intersection surface of the reference surface;

(d309) going to block (d302) upon condition that there are one or more edges of the intersection surface of the reference surface that have not been selected; and (d310) going to block (d301) upon condition that there are one or more edges of the reference surface that have not been selected.

13. The computer-readable medium as claimed in claim 12, wherein block (d307) comprises:

determining that the edge of the reference surface intersects with the edge of the intersection surface of the reference surface upon condition that a number of points from the point group is greater than or equal to a predetermined number, wherein each of the points from the point group is within a predetermined distance to the edge of the intersection surface of the reference surface.

14. The computer-readable medium as claimed in claim 8, wherein block (d4) comprises:

determining that the intersection surface of the reference surface is an inconsistent surface upon condition that:
(1) a normal to the nearest point of the reference surface in a corresponding edge points to a same direction as a normal to the nearest point of the intersection surface of the reference surface in a corresponding edge, and the reference intersection is not an inconsistent surface; or
(2) a normal to the nearest point of the reference surface in a corresponding edge points to an opposite direction with a normal to the nearest point of the intersection surface of the reference surface in a corresponding edge, and the reference intersection is an inconsistent surface.

* * * * *